UNITED STATES PATENT OFFICE.

FRANK S. WASHBURN, OF NASHVILLE, TENNESSEE.

PROCESS OF RECOVERING HIGH-GRADE PHOSPHORIC ACID.

1,149,233.  Specification of Letters Patent.  Patented Aug. 10, 1915.

No Drawing.  Application filed June 9, 1914.  Serial No. 844,018.

*To all whom it may concern:*

Be it known that I, FRANK S. WASHBURN, a citizen of the United States, residing at Nashville, in the county of Davidson and State of Tennessee, have invented certain new and useful Improvements in Processes of Recovering High-Grade Phosphoric Acid; and I do hereby declare the following to be a full, clear, and exact description of the invention, such as will enable others skilled in the art to which it appertains to make and use the same.

This invention relates to a process of recovering a high grade phosphoric acid from the crude product usually obtained from treating phosphate rock in fuel fed and electric furnaces, or from a combined treatment in fuel fed and electric furnaces, and has for its object to provide a method of obtaining a high grade phosphoric acid which will be more efficient and less costly than those heretofore proposed.

With these and other objects in view the invention consists in the novel steps and combinations of steps constituting my invention as will be more fully hereinafter disclosed and particularly pointed out in the claims.

In order that this invention may be more clearly understood it is said: In the manufacture of phosphoric acid in fuel fed or in electric furnaces, there is ordinarily employed a mixture of phosphate rock, or similar phosphatic material and a silicious flux, with or without the addition of carbonaceous material. This mixture is heated to a high temperature, either by special means of combustion or by electric current, and there is evolved more or less phosphorus pentoxid $P_2O_5$ as such, or in a reduced state, and in the form of a vapor which readily condenses to a fume as the temperature of the gases carrying it drops. At the same time it is found impossible to prevent a portion of the charge being volatilized, and another portion carried off as a fine dust, due to the rapid evolution of the gases from the body of the furnace, and to the high temperature therein. This volatilized foreign material and dust will be found to consist essentially of particles of phosphate rock, mechanically carried along with the gases, as well as volatilized lime $CaO$, silica $SiO_2$, silicon fluorid, etc., but if reducing conditions are strong enough said dust will contain some of the elements themselves. Air is always introduced into this dust either after it leaves the furnace, or before it leaves said furnace, and therefore these finely divided impurities are ultimately converted into oxids. These volatilized materials are in fact in just as fine a state of sub division as is the said phosphorus pentoxid, $P_2O_5$, so after condensation it is not possible to mechanically separate the very finest dust and the volatilized material from the $P_2O_5$, because of the fact that they all have approximately the same specific gravity and are of the same magnitude in particle dimensions. They, therefore, refuse to settle out to any considerable extent, and, should the electric furnace be used this said dust greatly increases in volume on account of the higher temperature employed and therefore purification in such case becomes of greater importance. It is true that a portion of the coarser particles of dust can be readily settled out, but such portion constitutes a very small fraction of the whole amount of material carried along by the gas currents.

Should one employ an electric furnace, the above phenomena will remain the same whether carbon is or is not used in the charge, for somewhere in the operation an oxidizing action must be caused to take place in order to convert all the vapors present into oxids before an absorption of the phosphoric acid takes place. It therefore follows that when this said acid is formed it of necessity must contain lime, silico - phosphates, and other impurities which are soluble in the strong phosphoric acid that is present in large excess, and therefore it is evident that a mere filtration of this said acid at this stage would only partly purify it. In other words, it is evident that the purification of furnace made, or thermic, or electro-thermic made phosphoric acid is a very different problem from the purification of phosphoric acid made in the wet way as will further appear below.

In fact even if one operates his furnace under reducing conditions the end result will produce oxids such as $P_2O_5$, $CaO$, $SiO_2$, etc., all in a very finely divided condition and which will give the same troubles as those encountered under non reducing conditions.

In fact, even if the vapors of the furnace containing these oxides are passed through absorption towers to recover the phosphoric acid in aqueous solution and to separate the lime, silica, and the dust by taking it up in the solution, one will still obtain a very impure solution of phosphoric acid, for said solution will show considerable quantities of sludge containing lime, silica, phosphoric acid, and the other impurities. An analysis of this sludge when filtered out will show that it in some cases contains as high as 20% of the total phosphoric acid evolved from the furnace, and this high percentage will be found even in the case of a large unit that is run at the high temperatures necessary to evolve $P_2O_5$ with efficiency.

Inasmuch as it is sometimes desired to transform this crude phosphoric acid over into salts of the alkali metals or of ammonia, the presence of these impurities becomes particularly serious. This is because upon neutralization with salts of the alkalis or of ammonia, there is formed a silico-phosphate, and di-calcium and tri-calcium phosphate, which carries down as insoluble products a very large proportion of the phosphoric acid made; and the whole process thereupon become uncommercial for the production of alkali or ammonia salts of phosphoric acid.

In carrying out my invention I proceed as above disclosed, preferably using a fuel fed furnace for a primary smelting operation, and an electric furnace as a finishing operation, and in order to insure the evolution of a very large percentage of the contained phosphorus, I preferably employ carbon in one or both of said furnaces. Further, in order to overcome the objections just recited in connection with the relatively large volume of finely divided dust like impurities, I feed into the system sulfuric acid in such quantities as to break up the silico-phosphates, thereby forming a gelatinous silica, and a phosphoric acid; while the lime phosphatic compounds form calcium sulfate and phosphoric acid. I next separate these products from the free phosphoric acid either by settlement in the receivers in the bottom of the towers, or by filtration, inasmuch as it is a simple matter to filter phosphoric acid solutions because of their noncorrosive properties when cold. This sulfuric acid addition to the crude solution can either be made directly to the absorbing waters used in the towers themselves, in which case it also assists in catching a larger proportion of the $P_2O_5$ than where pure water itself is used; or it could be made in the receiving tank to the strong acids from the tower. I prefer to make the addition to the concentrated phosphoric acid obtained from the end tower of the series, because I find that these strong acids precipitate the silica in a much better form for settlement and filtration, and further, these strong acids obtained from this tower have a less dissolving power on calcium sulfate than the weaker acids obtained in the other towers, and, therefore, it is possible to obtain a higher grade of phosphoric acid if the addition is made to the acid after the concentration.

It will thus be seen that although the ordinary furnace processes heretofore proposed have produced such large quantities of very finely divided dust like material that it could not be handled by any means or method which would produce commercial results yet by following the procedure above disclosed I am enabled to get very high yields of phosphorus from the original phosphate rock, and to make the process commercially successful.

It is obvious that those skilled in the art may vary the details of my process without departing from the spirit thereof and therefore, I do not wish to be limited to the above disclosure except as may be required by the claims.

What I claim is:

1. The process of making a high grade phosphoric acid from phosphate rock, which consists in subjecting a suitable mixture containing said rock and silica to the action of an electric furnace thereby producing a fume containing oxides of phosphorus, calcium and silicon; subjecting said fume to the action of a sufficient quantity of sulfuric acid to break up any silico-phosphates that may be formed; and suitably separating out the free phosphoric acid thus produced, substantially as described.

2. The process of making a high grade phosphoric acid from phosphate rock, which consists in subjecting a suitable mixture of said rock, silica and carbon, to the action of an electric furnace, thereby producing a fume containing the oxides of phosphorus, calcium, and silicon, as well as other impurities; subjecting said fume to the action of water to form a crude solution of phosphoric acid; adding to said solution sufficient sulfuric acid to break up any silico-phosphates that may form: and suitably separating out the free phosphoric acid thus produced, substantially as described.

3. The process of recovering a high grade phosphoric acid from crude phosphoric acid liquors containing the oxides of calcium and silicon, which consists in adding sufficient sulfuric acid to said liquors while they are being formed to break up any silico-phosphates that may be present; and subsequently removing the insoluble impurities, substantially as described.

4. The process of recovering a high grade phosphoric acid from crude phosphoric acid liquors, containing compounds of calcium, silicon, and other impurities, which consists in adding sufficient sulfuric acid to said liquors while they are being formed to cause insoluble precipitates of the contained impurities and to break up any silico-phosphates and phosphatic compounds of calcium that would otherwise exist; and suitably separating said insoluble precipitates from said liquors; substantially as described.

In testimony whereof I affix my signature, in presence of two witnesses.

FRANK S. WASHBURN.

Witnesses:
 K. F. COOPER,
 S. WARREN MAY.